3,474,989
PROGRAMMED CONTROL FOR AIRCRAFT
LAUNCHING AND ARRESTING GEAR
John Sherman Strance, Dover, Mass., assignor to E. W.
Bliss Company, Canton, Ohio, a corporation of Delaware
Filed Sept. 11, 1967, Ser. No. 666,826
Int. Cl. B64f 1/02, 1/04
U.S. Cl. 244—110                                          3 Claims

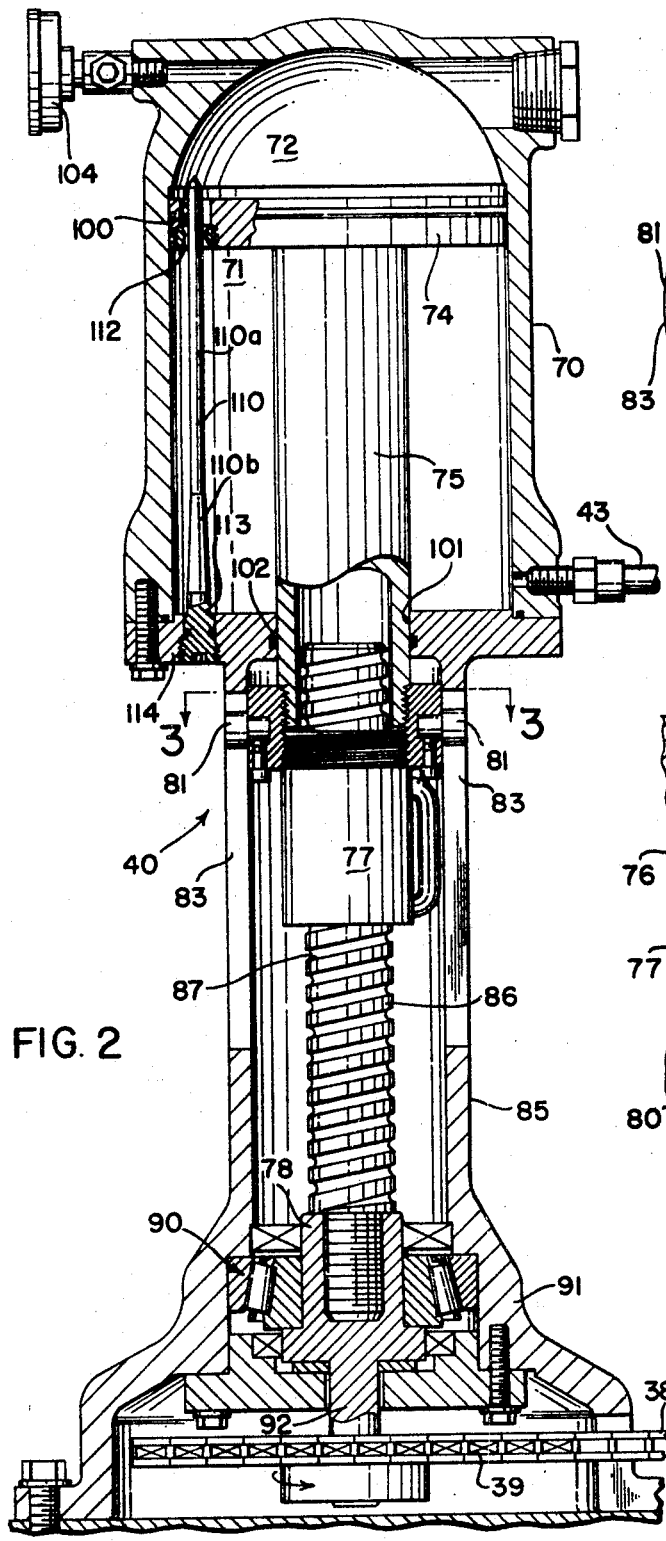
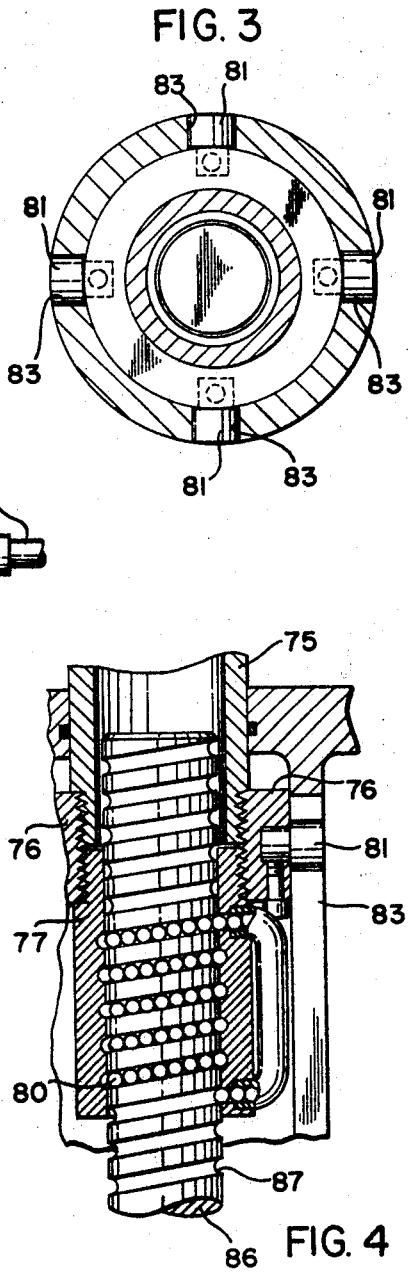
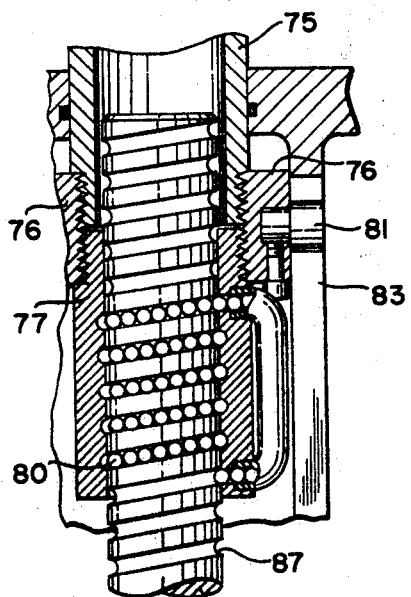
FIG. 2
FIG. 3
FIG. 4
INVENTOR.
JOHN S. STRANCE
BY Meyer, Tilberry & Body
ATTORNEYS United States Patent Office 3,474,989
Patented Oct. 28, 1969

ABSTRACT OF THE DISCLOSURE

The disclosure pertains to the art of launching or recovering aircraft from runways having a limited space for takeoff or landing and will be described in particular with respect to recovery gear comprising a rotatable reel having a coiled purchase member thereon such as a textile tape, one end of which is adapted to be engaged by the aircraft and towed down the runway upon landing. An hydraulic brake coupled to the reel retards reel rotation and thus the rate of deceleration of the aircraft consistent with the speed of aircraft engagement, length of runout and other factors. A programmed control varies hydraulic pressure on the brake as a function of the linear displacement of a piston within a cylinder which is filled with fluid below the piston. The piston moves at a rate proportional to the number of reel turns from the beginning of arrestment. For any aircraft runout, the piston will always have the same axial location in the cylinder for a particular number of reel turns. A metering rod passes through a metering orifice in the piston to control the rate at which hydraulic fluid is displaced from one side of the piston to the other, thus by varying portions of the cross sectional area of the metering rod, the displacement of hydraulic fluid through the metering orifice can be controlled and thus the braking pressure varied in accordance with a predetermined recovery program.

---

Launching and recovery gear for aircraft are known which deliver or absorb reel torque in accordance with a desired program as a function of reel r.p.m.'s and indirectly, aircraft speed. The program is consistent with the particular requirements of the system such as weight of the aircraft, speed of engagement, runway length, tape elasticity and other factors. A reel and tape launching or recovery system of the general type referred to is disclosed, for example, in United States Patent 3,142,458 issued July 28, 1964.

The system described in the aforementioned patent employs an hydraulic pump directly connected to the reel, the output of which flows through a control valve regulated by a cam also driven by the reel. Thus, rotation of the cam, as well as the hydraulic pump, is a function of reel r.p.m.'s and indirectly of aircraft speed. The control valve opening is determined by the cam profile which is always the same at any particular location of the aircraft on the runway. The contour of the cam thus provides a programmed brake pressure by opening or closing the valve to insure the optimum rate of reel rotation for that particular stroke distance.

The present invention combines in one control unit the separate functions of all three devices in the former system, namely the gear pump, cam and control valve.

In accordance with the invention, a rotatable reel is provided having a coilable purchase member thereon adapted to be engaged by an aircraft. A fluid responsive device is coupled to the reel for controlling reel rotation. An hydraulic programmed control is connected to the fluid responsive device for varying the fluid actuating pressure in accordance with a desired program of reel rotation and comprises a chamber, a movable wall dividing the chamber into two sections sealed from each other, an incompressible fluid filling one section, means driven by the reel for moving the wall in the chamber at a velocity proportional to reel rotation and a metering device between the two sections through which fluid is displaced by the wall from one section to the other having a variable cross sectional area which is a function of the displacement of the wall thereby varying the fluid pressure delivered to the fluid responsive device in accordance with the number of reel turns elapsed.

Further in accordance with the invention, the movable wall is a piston reciprocated on a ball screw actuator driven by the reel such that the velocity of the piston is always proportional to the aircraft velocity. Hydraulic fluid is forced from one side of the piston to the other side at a controlled rate as determined by the free cross sectional area of the metering device which includes a metering orifice in the piston and a metering rod passing through the orifice as the piston is traversed. The contour of the metering rod determines the available free cross sectional area through which hydraulic fluid can flow at any particular stroke length and thus the fluid actuating pressure varies as a function of piston displacement and aircraft runout.

When used as an arresting gear, air at a known pressure on one side of the piston may apply a static brake pressure which during the arrestment stroke is reduced. The reduction in pressure is due to withdrawal of the piston rod from the fluid cylinder which allows the air to expand. The relative volumes of the piston rod and air may be selected so that at the end of the stroke, the air pressure is less than the mechanical pressure exerted by the brake return springs. Thus the brake is released and the gear may be rewound whereupon the static pressure is reestablished on the brake holding the purchase member taut for the next arrestment.

A principal object of the invention is to provide a greatly simplified hydraulic programmed control.

A further object is to provide a control mechanism in which rotary motion is converted to linear motion which is proportional to the aircraft position on the runway, the linear motion being used for applying a variable hydraulic pressure to achieve optimum reel rotation.

Another object is to provide a metering orifice and metering rod arrangement for varying the fluid pressure by restricting the flow of hydraulic fluid through the orifice in a controlled fashion as determined by the profile of the metering rod.

Another object is to provide an arresting gear control in which the brake is initially engaged and later disengaged automatically as a function of the relative volumes of air existing in the control cylinder at the beginning and end of the arrestment stroke.

These and other objects will be apparent by referring to the following description and drawings wherein FIGURE 1 is a schematic view of an arresting gear incorporating an arresting gear employing a double reel and tape complex in which each reel is controlled by separate hydraulic brakes;

FIGURE 2 is a vertical sectional view of the control used in FIGURE 1;

FIGURE 3 is a cross sectional view through the control taken along line 3—3 of FIGURE 2;

FIGURE 4 is a fragmentary sectional view of the ball nut and screw actuator for the control; and FIGURE 5 is a fragmentary view of a modified control in which the air pressure in the control cylinder is applying static brake pressure.

Figure 1:
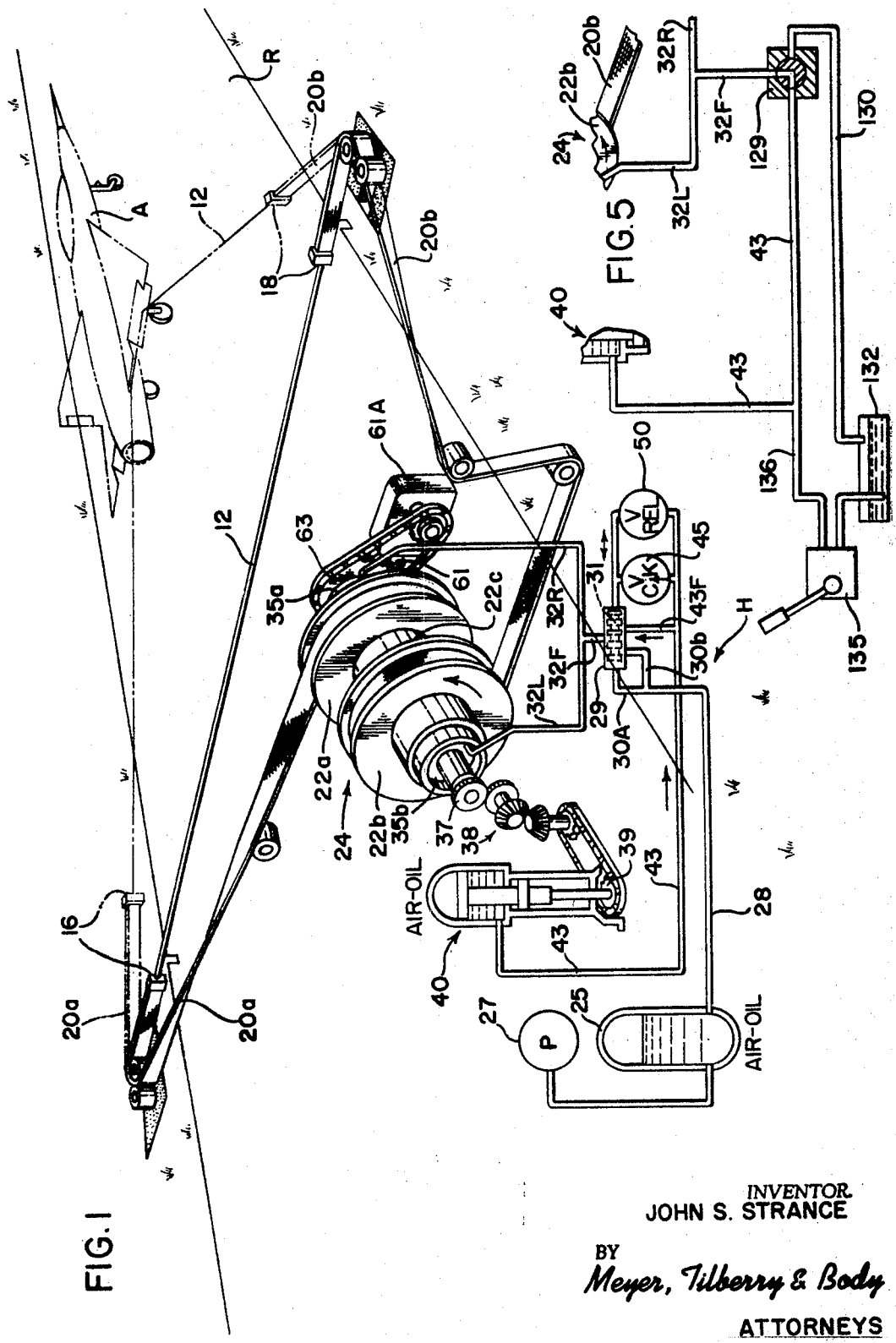

Although the invention may be used in both launching and arresting operations, the description herein will be with respect to an arresting gear only inasmuch as the operation with respect to launching is essentially the reverse in a reel-tape system, i.e., in arresting, the tape is initially coiled upon the reel and is unwound under a restraining torque applied to the reel by a brake while in launching, the tape is initially unwound from the reel and is progressively coiled thereon during the launch, the reel being driven through a variable actuated clutch by means of an engine or flywheel.

Referring now to the drawings wherein the showings are of a preferred embodiment of the invention only and not for the purpose of limiting same, in FIGURE 1, a typical arresting installation is shown in which an aircraft A makes engagement with a pendant 12 stretched transversely of the runway R. The opposite ends of the pendant 12 are secured to tape-to-pendant connectors 16, 18 of the arresting gear comprising a pair of tapes 20a, 20b which are spirally wound on separate reels 22a, 22b of a spool 24. When the spool 24 revolves in the direction of the arrows, the tapes 20a, 20b will pay out in opposite directions from the reels to permit the pendant 12 to move with the aircraft down the runway. The reels 22a, 22b are coupled with a clutch 22c to permit differential angular velocity in the case of off center arrestments wherein one reel initially is permitted to rotate faster than the other in centering the aircraft on the runway. In the installation shown the entire spool 24 may be encased in a pit beneath the runway; or alternatively may be installed on the surface adjacent one side of the runway.

Referring now to the hydraulic system H, a static air-oil reservoir 25 is maintained under pressure by means of a pump 27. Hydraulic fluid is directed through line 28 to a shuttle valve 29. Pressure in branch line 30A shifts a piston 31 to the right thereby connecting branch line 30b to a brake actuator feeder line 32F and brake actuator lines 32L, 32R. Rotation of reels 22a, 22b is controlled by rotary friction brakes 35a, 35b at opposite ends of the spool 24. Thus, static brake pressure tank 25 maintains pressure on brakes 35a, 35b, which in turn maintains pendant 12 in tension transversely of the runway R, and in readiness for interception by a landing aircraft.

When the pendant 12 is contacted by the aircraft A, it immediately commences to pull the tapes 20a, 20b accelerating the reels 22a, 22b as depicted by the phantom line position. On one end of the spool shaft 37 there is a drive 38 for rotating a sprocket 39 of the programmed control 40, which in accordance with the invention, delivers a predetermined brake pressure to the brakes 35a, 35b to achieve optimum reel rotation throughout the arrestment stroke as described hereinafter.

Fluid pressure from the control 40 is carried in line 43 through a check valve 45 to the right side of shuttle valve 29. As the fluid pressure builds in the system corresponding to the increased velocity of the reels 22a, 22b the static pressure side of the valve 29 applied by line 30A is overcome and the piston 31 is shifted to connect feeder lines 43F and 32F to lines 32L, 32R whereupon the pressure from the control 40 replaces the static pressure from the static brake pressure tank 25. Programming brake pressure is now delivered to the brakes 35a, 35b to retard reel rotation at an optimum rate consistent with the particular arrestment cycle. As the aircraft A is slowed to a stop, so are the reels. In order to restore the system for a second arrestment, a normally closed manual shut-off valve 50 is opened to relieve the pressure on the operating side of the piston 31 releasing the brakes. After the tapes have been rewound the pressure from the static brake pressure tank 25 is permitted to again shift the piston 31 to re-establish static pressure on the reel brakes in a known manner. To recycle the gear a rewind motor 61 drives a gear box 61A which is chain driven to a sprocket 63 secured to the end of the spool shaft 37 opposite from that of the drive 38 for the fluid pressure control 40.

Referring now to FIGURES 2–4, control 40, for delivering the programmed brake pressure comprises a cylinder 70 divided into two sections 71, 72 by a piston 74 forming a movable wall which travels axially within the section 71 on a hollow rod 75. As shown in FIGURE 4, the rod 75 is threaded on one end to receive a nipple 76 in the opposite ends of which is threaded a ball nut 77 carrying a recirculated train of balls 80. The nipple 76 has four laterally projecting guide lugs 81 on the side thereof which are received in longitudinal slots 83 (FIG. 3) extending parallel to the axis of a tubular housing 85 for the ball nut and screw actuator. A screw 86 having a helical ball trace 87 within which the balls 80 travel carries the ball nut 77 and is received at one end within the hollow rod 75 and is threaded at the opposite end into a member 78 which is rotatably mounted on roller bearings 90 within a bell shaped enlargement 91 of the tubular housing 85. Sprocket 39 is keyed on the end of an extension 92 of member 78 and is driven by the drive 38 from the reel spool 24.

Piston 74 has an O-ring 100 sealing with the walls of the cylinder 70 and hollow piston rod 75 is sealed for movement relative to the opening 101 in cylinder 70 by means of O-ring 102. Section 71 of the cylinder 70 below the piston 74 is filled with hydraulic fluid while section 72 is filled with air under pressure which is of a magnitude below that which would cause a displacement of the hydraulic fluid in chamber 71 through the brake line 43 when considering that such pressure is acting in opposition to the static pressure on the valve 29 delivered by line 30A. Thus, air pressure in section 72 is critical to the operation of the system and a gauge 104 is provided for checking this pressure.

With the reels 22a, 22b rotating and paying out tapes 20a, 20b, the drive 38 turns the sprocket 39 of the control 40 in a counterclockwise direction as viewed in FIGURE 1 causing rotation of the screw 86 which, through the ball nut 77, commences downward displacement of the piston 74 thus increasing the hydraulic pressure in brake line 43 above that developed by the static air pressure. It will be apparent that as the pressure developed exceeds the static pressure acting in opposition thereto on the valve 29, the piston 31 will shift to the left connecting line 43F to the feeder line 32F and branch lines 32L, 32R thus delivering pressure to the brakes 35a, 35b. The faster the reels 22a, 22b are rotated, the greater will be the pressure developed on the brakes acting to resist rotation. Thus, when the aircraft A is at its greatest velocity after contacting the pendant 12, the resistance to forward movement is the greatest. As the plane is gradually decelerated, the reel will decelerate also and so will the rate of linear displacement of the piston 74. The pressure in the brakes will decrease correspondingly. It is desirable, however, that once the reels are accelerated that a relatively constant tension be maintained on the tapes 20a, 20b to insure a smooth arrestment stroke.

In accordance with the invention, the control 40 includes a programming device that pressurizes the brakes in accordance with the optimum rate of energy absorption for the particular arrestment conditions. The preferred programming device includes a metering rod 110 and metering orifice 112. The rod 110 has a base 113 which is threaded into the base 114 of the cylinder 70 and projects upwardly through the section 71 and into the metering orifice 112 formed in the piston 74. The rod 110 has a profile, which in conjunction with the metering orifice 112, establishes the pressure program for the brakes through the arrestment stroke. For example, portion 110a is joined by a tapered portion 110b adjacent the base 113. The metering program will be to slightly decrease the brake pressure as the piston 74 traverses the length of portion 110a. Upon reaching the portion 110b the open area of metering orifice 112 will progressively decrease near the end of the arrestment stroke.

The program takes into account the fact that the torque moment arm, represented by the distance between the axis of the reels and the tape tangential payout line decreases as tape is unwound from the reels thus tending to increase tape tension. But there is a substantially compensating decrease in torque to the programmed pressure decrease on the brakes in order to maintain tape tension constant which is desirable. This portion of the program is controlled by the portion 110a of the metering rod 110. Clearly, the length of the tapered portion 110b relative to the portion 110a may be varied as well as the degree of taper. In fact, rather than straight or tapered portions, the metering rod may have a curved profile relative to the rod axis. In some cases the profile of the portion 110a may be varied, for example, a launching stroke where an hydraulically actuated clutch instead of a brake is employed. In that case the profile of portion 110a may be tapered or curved to vary clutch engagement pressure, gradually at first and then building to maximum pressure on the clutch as the reels become fully accelerated thereafter maintaining a pressure consistent with optimum reel rotation throughout the launch stroke and finally disengaging the clutch as the aircraft becomes airborne.

Considering now a cycle of operation, it will be noted that the control 40 initially is in the position shown in FIGURE 2 with the piston 74 at the top of section 71. It will be recalled that piston displacement is in all cases proportional to the number of reel turns since it is driven by the linear ball screw actuator and drive 38 from the reel shaft. For any aircraft runout the piston 74 will always have the same location in the cylinder 70 for a particular number of reel turns. It follows therefore that the velocity of the piston 74 is always proportional to the aircraft velocity since it is directly proportional to reel rotation. It thus becomes possible to use the linear piston movement within chamber 71 as the basis for programming the arrestment stroke. This is done by regulating the flow of hydraulic fluid from section 71 through the metering orifice 112 into the section 72 on the opposite side of the piston. Thus, as the piston moves relative to the rod 110 the contour of the rod provides the braking program consistent with optimum energy absorbing characteristics required of the particular arrestment as explained previously. As the arrestment continues it can be observed that the volume of chamber 71 below the piston 74 is decreasing. When the aircraft has reached the full runout position, essentially all of the hydraulic fluid in section 71 will have been displaced through the metering orifice 112 into section 72. The final static air pressure in section 72 is always below the equivalent pressure of the brake return springs. Thus, upon opening relief valve 50 (FIG. 1) the pressure in the brakes will be released to permit recycling of the gear. When the pendant 12 has been reestablished in a taut condition across the runway in preparation for the next arrestment, the piston 31 of valve 29 will be caused to shift in any known manner to reestablish static brake pressure.

Referring to FIGURE 5, the control 40 may apply the static brake pressure by itself, thus eliminating the pressure tank 25, valve 29, etc. from the system as shown in FIGURE 1. The control 40 remains unchanged. Line 43 is connected directly to a manual two-way valve 129 which at the beginning and during arrestment connects line 43 and 32F to the branch lines 32L; 32R. With this system, the static brake pressure is applied by the air pressure in section 72 of the cylinder (FIG. 2). During arrestment, the piston rod 75 is substantially withdrawn from the cylinder. Thus at the end of the stroke, the air pressure is reduced by an amount determined by the increase in volume due to the partial withdrawal of the rod 75. It is necessary therefore, with this system, as opposed to that shown in FIGURE 1, that the relative volumes of the air and rod 75 be closely matched with the mechanical pressure exerted by the brake return springs. For example, if the air pressure in the section 72 is say 100 p.s.i. static at the start, the rod 75 can be sized so that the final pressure at aircraft runout is 25 p.s.i. With the return spring pressure of the brakes at 50 p.s.i., the brakes will be automatically released at the end of the stroke. Upon recycling the gear, valve 129 is shifted to connect line 32F with return line 130 and reservoir 132. The static pressure is restored sufficiently as the piston 74 rises and the rod 75 reenters the cylinder 70 to overcome the brake return spring pressure when the tapes have been rewound. A hand pump 135 with a built-in check valve supplies hydraulic fluid through line 136 to replenish fluid lost through leakage or the like.

What is claimed is:
1. An aircraft arresting device comprising rotatable reel means having a coilable purchase member coiled thereon, said purchase member being uncoiled from said reel means and said reel means being rotated during arrestment of an aircraft, braking means for retarding rotation of said reel, control means for actuating said braking means, said control means including static brake actuating means for engaging said braking means with said reel means when said reel means is stationary and dynamic brake actuating means for engaging said braking means with said reel means when said reel means is rotating, said control means including a fluid chamber, a movable wall dividing said chamber into first and second compartments, said first compartment defining said static brake actuating means and said second compartment defining said dynamic brake actuating means, drive means coupling said movable wall to said reel means, said drive means being operated when said reel is rotated to move said movable wall in a direction and to increase the volume of said first compartment and to decrease the volume of said second compartment, a substantially incompressible fluid in said second compartment, a compressible fluid in said first compartment, said compressible fluid being at a high pressure when said coilable element is coiled upon said reel and acting to engage said braking means, said compressible fluid being at a low pressure when said coilable element is uncoiled from said reel means after arrestment of an aircraft, said low pressure being insufficient to engage said braking means.

2. The device of claim 1 and including metering means for varying the flow rate at which said substantially incompressible fluid escapes from said second compartment during movement of said movable wall when said reel means rotates.

3. The device of claim 2 and including rod means extending through said second compartment, said rod means being connected with said movable wall, said rod means being withdrawn from said second compartment during movement of said movable wall when said reel rotates, said substantially incompressible fluid being transferred from said second compartment to said first compartment through said metering means during movement of said movable wall when said reel rotates, said first chamber increasing in volume during movement of said movable wall at a greater rate than the rate at which the volume of said second chamber is decreasing.

References Cited

UNITED STATES PATENTS

| | | |
|---|---|---|
| 2,580,751 | 1/1952 | Fletcher. |
| 2,843,228 | 7/1958 | Wysor _____ 244—110 XR |
| 2,969,856 | 1/1961 | Dow _____ 244—110 XR |
| 3,182,935 | 5/1965 | Wischhoefer _____ 244—110 |
| 3,392,938 | 7/1968 | Cruger et al. _____ 244—110 |

FOREIGN PATENTS

| | | |
|---|---|---|
| 1,075,292 | 4/1954 | France. |
| 274,388 | 7/1927 | Great Britain. |

MILTON BUCHLER, Primary Examiner

PAUL E. SAUBERER, Assistant Examiner

U.S. Cl. X.R.

188—96; 244—63; 303—10